United States Patent [19]

Hillig et al.

[11] Patent Number: 4,640,904

[45] Date of Patent: Feb. 3, 1987

[54] MULLITE BY REACTIVE HOT PRESSING

[75] Inventors: William B. Hillig, Ballston Lake, N.Y.; Solomon Musikant, Paoli, Pa.

[73] Assignee: General Electric Company, Schenectady, N.Y.

[21] Appl. No.: 747,536

[22] Filed: Jun. 21, 1985

[51] Int. Cl.$^4$ ............................................. C04B 35/18
[52] U.S. Cl. .................................. 501/128; 423/327; 264/125
[58] Field of Search ..................... 423/327; 501/128; 264/125

[56] References Cited

U.S. PATENT DOCUMENTS

| | | | |
|---|---|---|---|
| 1,862,974 | 6/1932 | McDougal | 501/141 |
| 3,826,813 | 7/1974 | Gardner et al. | 423/327 |
| 3,922,333 | 11/1975 | Mazdiyasni et al. | 423/327 |
| 4,266,978 | 5/1981 | Prochazka | 264/125 |
| 4,272,500 | 6/1981 | Eggerding et al. | 501/5 |
| 4,384,046 | 5/1983 | Nakagami et al. | 423/327 |
| 4,418,024 | 11/1983 | Prochazka et al. | 423/327 |
| 4,539,300 | 9/1985 | Coblenz | 501/98 |

*Primary Examiner*—Helen M. McCarthy
*Attorney, Agent, or Firm*—Jane M. Binkowski; James C. Davis, Jr.; James Magee, Jr.

[57] ABSTRACT

A mixture of alumino-silicate glass and alumina having a composition corresponding to mullite and containing a nucleating mullite powder is hot pressed producing a dense polycrystalline mullite body having an average grain size of less than 15 microns.

12 Claims, 1 Drawing Figure

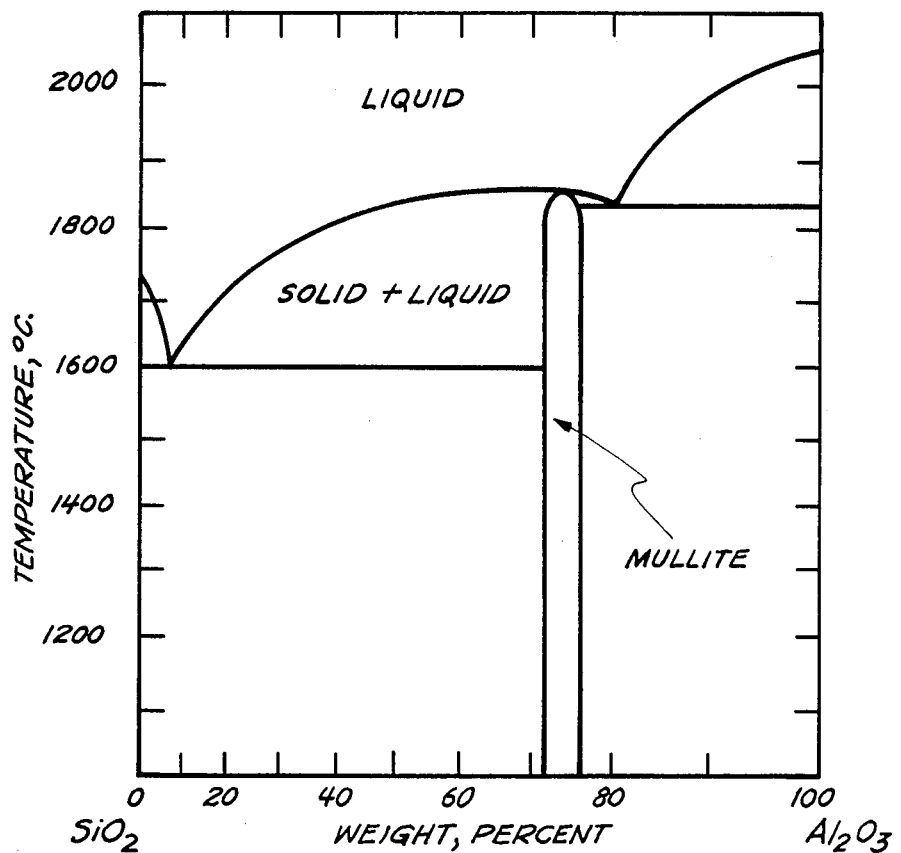

MULLITE BY REACTIVE HOT PRESSING

The present invention relates to the production of a polycrystalline mullite body by reactive hot pressing.

In copending U.S. patent application Ser. No. 747,199 entitled MULLITE MATRIX COMPOSITE, filed on even date herewith in the names of W. B. Hillig and S. Musikant and assigned to the assignee hereof and incorporated herein by reference, there is disclosed the hot pressing of a mixture of alumino-silicate glass, alumina and filler to produce a mullite composite.

Polycrystalline mullite, a polycrystalline aluminum silicate phase of composition $3Al_2O_3.2SiO_2$ or close to $3Al_2O_3.2SiO_2$ can contain from about 71.5 weight % to about 76 weight % $Al_2O_3$ and it has a melting point generally above 1820° C. depending on its specific composition.

Mullite is an attractive high temperature structural ceramic material because of its high melting temperature, its relatively low thermal expansivity and thermal conductivity compared with alumina. However, pure mullite ceramics are relatively difficult materials to produce. Conventionally made material does not have outstanding strength.

The present invention utilizes reactive hot pressing, a technique which involves hot pressing a mixture of materials which will undergo some type of chemical reaction or transformation during the heat treatment. The resulting material will then have the same overall chemical composition as the starting material, but its phase content will be different.

Those skilled in the art will gain a further and better understanding of the present invention from the detailed description set forth below, considered in conjunction with the accompanying figure forming a part of the specification which is a phase diagram for the $SiO_2$-$Al_2O_3$ system showing the present mullite phase.

Briefly stated, the present process for producing a polycrystalline mullite body having an average grain size of less than about 15 microns and a porosity of less than about 5% by volume of said body comprises forming a mixture of amorphous alumino-silicate glass, alumina and nucleating polycrystalline mullite powder, said glass being comprised of from about 15% by weight to about 4.0% by weight $Al_2O_3$ balance $SiO_2$ and having a liquidus temperature below about 1800° C., said glass and alumina being present in amounts required to produce mullite, said nucleating mullite powder having an average particle size of less than 5 microns and ranging from about 0.1% by weight to about 10% by weight of the total weight of said glass and alumina, and hot pressing the mixture at a temperature at which said glass is fluid but below its liquidus temperature under a pressure at least sufficient to force the fluid glass to dissolve said alumina and react with it forming said polycrystalline mullite body.

The present alumino-silicate glass can be formed by a number of techniques and can be produced by conventional glass making techniques from a mixture of $Al_2O_3$ and $SiO_2$. The present alumino-silicate glass is an amorphous material comprised of from about 15% by weight to about 40% by weight $Al_2O_3$ balance $SiO_2$. Preferably, it contains as much $Al_2O_3$ as practical since with increasing $Al_2O_3$ content, the fluidity of the glass increases. Frequently, however, the glass contains from about 20% by weight to about 30% by weight $Al_2O_3$ since glass with a higher content of $Al_2O_3$ requires significantly higher temperatures for its preparation and the required high temperature equipment may not be conventionally available.

The present alumino-silicate glass has a liquidus temperature which is less than about 1800° C. and which generally ranges from above about 1600° C. to less than about 1800° C. depending on its particular $Al_2O_3$ content, i.e. the higher the $Al_2O_3$ content the higher is its liquidus temperature. By the liquidus temperature of the glass herein it is meant that temperature at which no crystalline material can exist stably. Also, the higher the $Al_2O_3$ content of the glass, the more fluid it is at a given temperature. For example, at 1300° C. the glass comprised of 40% by weight $Al_2O_3$ and 60% by weight $SiO_2$ is fluid and has a viscosity of about 20,000 poise whereas the glass containing 15% by weight $Al_2O_3$ is practically not fluid. By a fluid glass herein it is meant a plastic deformable glass.

The present glass and alumina powders are used in amounts required to produce the mullite phase. The average particle size of the glass and alumina powders can vary, and generally, it is less than about 10 microns, and preferably, it is submicron to promote dissolution of the alumina in the glass.

In the present process, a nucleating agent comprised of polycrystalline mullite powder is used to produce a polycrystalline mullite body of uniform or substantially uniform grain size with an average grain size of less than about 15 microns. The present nucleating agent constitutes the microcrystalline growth centers on which further growth into the final mullite grains occurs. The nucleating mullite powder preferably is of uniform or substantially uniform particle size. Its average particle size depends largely on the average grain size desired in the mullite body and is determinable empirically, and generally, it is less than about 5 microns. Ordinarily, the finer the size of the nucleating agent, the finer will be the grain size of the resulting mullite body. Preferably, the average particle size of the nucleating powder is about 20% of the desired average grain size of the resulting mullite body. In the present invention, the nucleating powder preferably has an average particle size which is less than about 2.5 microns, more preferably less than about 1 micron, and most preferably it ranges between about 0.1 micron to about 0.5 micron. In a preferred embodiment, a nucleating mullite powder having an average particle size ranging between about 0.1 micron to about 0.5 micron is used to produce the present polycrystalline mullite body having an average grain size of about 1 micron.

The particular amount of nucleating mullite powder used is determinable empirically and depends largely on the amount of alumino-silicate glass and alumina present. The nucleating powder must be present in at least an amount which provides sufficient growth centers to produce the mullite grain size desired. Generally, in the present process, the nucleating powder is used in an amount ranging from about 0.1% by weight to about 10% by weight, preferably from about 0.5% by weight to about 5% by weight of the total weight of the alumino-silicate glass and alumina. An amount of nucleating powder less than about 0.1% by weight may not be enough to be operable whereas an amount in excess of about 10% by weight may have a detrimental effect on the fluidity of the glass. Generally, the finer the size of the nucleating powder, the less of it is needed to produce the present mullite body.

In conventional glass-ceramics, materials such as TiO$_2$ are added to the glass to promote nucleation. Such additions constitute impurities which generally result in the formation of some liquid phase significantly below the melting point of the pure material. The formation of such liquid has a deleterious effect on mechanical strength and creep resistance, whereas in the present invention the use of mullite powder as the nucleation agent does not introduce impurities into the glass and, therefore, does not result in such deleterious effects.

In carrying out the present process, a uniform or at least a substantially uniform mixture is formed of the components, i.e. alumina powder, alumino-silicate glass powder and nucleating agent. The glass and alumina are used in the amounts required to react to form the mullite phase.

The components can be admixed by a number of conventional techniques such as, for example, ball milling, vibratory milling or jet milling, to produce a uniform or substantially uniform mixture. The more uniform the mixture, the more uniform is the microstructure, and therefore, the properties of the resulting composite.

Representative of these mixing techniques is ball milling. Milling may be carried out dry or with the charge suspended in a liquid medium inert to the ingredients. Typical liquids include ethyl alcohol and acetone. Wet milled material can be dried by a number of conventional techniques to remove the liquid medium.

Hot pressing of the mixture is carried out in a atmosphere that is non-detrimental to hot-pressing dies and to the mixture of alumina, alumino-silicate glass and mullite powders, and which does not cause sticking between the dies and the product. More particularly, hot pressing of the particulate mixture is carried out in a protective atmosphere in which the mixture is inert or substantially inert, i.e. an atmosphere which has no significant deleterious effect on it. Representative of the hot pressing atmospheres is nitrogen, argon, helium or a vacuum.

In carrying out the present process, the mixture is hot pressed under a pressure and temperature and for a sufficient period of time to produce the present polycrystalline mullite body. Maximum hot pressing temperature generally ranges from about 1500° C. to about 1750° C., and preferably from about 1550° C. to about 1700° C., depending largely upon the particular alumino-silicate glass used and is determinable empirically. Specifically, the hot pressing temperature must make the glass sufficiently fluid so that under the applied pressure it intermixes with and/or encapsulates the alumina particles dissolving the alumina and reacting with it to produce the present polycrystalline mullite body. Temperatures lower than about 1500° C. generally are not high enough to make the glass sufficiently fluid to produce the present mullite body. On the other hand, temperatures above 1750° C. are too close to the maximum liquidus temperature of the glass. At or close to the liquidus temperature of the glass, portions of the alumina powder will dissolve too quickly in the glass reacting with it too rapidly forming a substantial amount of polycrystalline mullite prematurely thereby preventing the remaining fluid glass from intermixing with the remaining alumina particles sufficiently to produce the present polycrystalline mullite body.

The heating rate to the present maximum hot pressing temperature is determinable empirically. It should be sufficiently rapid to prevent dissolution of the alumina in the glass to any significant degree, and thereby prevent any significant formation of crystalline mullite below the maximum hot pressing temperature which may prevent production of the present mullite body. Such heating rate may be as low as about 30° C. per minute, but preferably, it is at least about 50° C. per minute, and most preferably it is about 200° C. per minute. The maximum heating rate in the present process is limited only by the equipment.

The hot pressing pressure can vary and should be at least sufficient to confine the material in the hot press and make the mullite reaction take place during the present reactive hot pressing and can be at least about 200 psi. Hot pressing pressure can range to a maximum pressure which is limited by the available pressing equipment. Typically, hot pressing pressure ranges from about 2000 psi to about 8000 psi.

In the present process, there is no significant loss of the components forming the present mullite body.

The present hot pressed body is comprised of polycrystalline mullite phase of uniform or, substantially uniform grain size having an average grain size preferably of less than 10 microns and a porosity of less than about 5% by volume of said body. Also, the polycrystalline body is phase pure mullite.

The present polycrystalline mullite body can contain a glassy phase in an amount of less than about 20% by volume, preferably less than about 10% by volume, more preferably less than about 5% by volume, and still more preferably less than about 1% by volume, of the total volume of the body. Even more preferably, the present polycrystalline body contains only a detectable amount of glassy phase. Therefore, glassy phase in the present body can range from a detectable amount up to about 20% by volume of the total volume of the body. The amount of glassy phase present in the mullite body depends largely on the insufficient crystallization of the mullite phase formed in situ. Conversion of the glassy phase to polycrystalline mullite can be done by subsequently heating the hot pressed body at or about atmospheric pressure in air at a temperature ranging from about 1200° C. to about 1500° C. for a time period determinable empirically.

Preferably, the present mullite body has a porosity of less than about 2% by volume, more preferably less than about 1% by volume, and most preferably it is fully dense, i.e. it has no significant or detectable porosity.

The present mullite body has an average grain size which depends largely on the particle size of the nucleating mullite powder. Also, the nucleating action of the mullite powder enables the present formation of a uniform or substantially uniform grain size. More specifically, the present mullite body has an average grain size of less than about 15 microns, preferably less than about 10 microns, more preferably less than about 5 microns, still more preferably less than about 2 microns, and most preferably, it is about 1 micron or less.

The present polycrystalline body has a number of uses. It is useful as packaging for integrated circuits and for electronic substrate applications. It is especially useful as a substrate for a semiconducting Si chip for use in computers since its thermal expansivity closely matches that of Si.

The invention is further illustrated by the following example:

EXAMPLE 1

The alumina powder had an average particle size of 0.3 micron.

The alumino-silicate amorphous glass powder had an average particle size of about 2 microns and was comprised of 20 weight % $Al_2O_3$ and 80 weight % $SiO_2$.

The nucleating agent was composed of polycrystalline mullite powder of submicron average particle size.

A mixture having the gross composition corresponding to $3Al_2O_3.2SiO_2$ was made up comprising 10.00 grams of the alumino-silicate glass, 20.37 grams of the alumina and 3.07 grams of the nucleating mullite powder. Specifically the mixture was prepared by wet mixing the components in a ball mill at room temperature and then drying the slurry in air producing a substantially uniform mixture.

A four gram portion of the mixture was die pressed into a pellet at room temperature. The pellet then was hot pressed under an applied pressure of 2500 psi. Hot pressing was carried out in an induction-heated graphite die in a nitrogen atmosphere. Heating rate to the maximum hot pressing temperature was about 200° C. per minute. At 1300° C. the greatest degree of compaction of the pellet was observed. The temperature was taken up to 1700° C. where it was held for about 5 minutes and then furnace cooled to ambient temperature. The total time of heating was about 12 minutes.

The resulting hot pressed body was polished. Microscopic examination of the polished surface showed negligible porosity, i.e. less than about 1% by volume of the body. There was some sub-surface haziness evident which could not be resolved under a microscope at 1000×.

X-ray diffraction analysis of the body showed very strong mullite lines.

The hot pressed body was immersed in boiling aqueous 10 w/o NaOH solution for about 20 minutes, rinsed off with water and dried. Microscopic re-examination of the body showed no evidence for any pitting or other localized material removal, that is no pockets of glass phase were detectable. However, there was some localized etching revealing uniform grains of about 1 micron in diameter.

This hot pressed body would be useful for electronic substrate applications.

The hot pressed body was heated in air at atmospheric pressure at 1400° C. for 48 hours and then repolished. The gross appearance changed from a blackish translucent body to a white opaque body as a result of the heat treatment. The polished heat treated sample was immersed in boiling aqueous 10 w/o NaOH solution for about 20 minutes, rinsed with water and dried. Microscopic examination showed that it looked the same as before the heat treatment.

It was then swabbed with aqueous 10 w/o HF solution for 2 minutes, rinsed off with water and dried. Microscopic examination revealed no change in appearance, providing further support for the absence of any residual pockets of untransformed glass. The body was then immersed in boiling aqueous 50 w/o NaOH solution for 5 minutes, rinsed off with water and dried. Microscopic re-examination of the body revealed over its surface very uniform grains of the order of about 1 micron in diameter. Also, the etching did not reveal any detectable glass content as would be noted by pitting.

X-ray diffraction analysis again showed very strong mullite lines, with some indication of minor amount of amorphous material. This hot pressed body also would be useful for electronic substrate applications.

What is claimed is:

1. A body consisting of polycrystalline mullite phase of substantially uniform grain size having an average grain size of less than 2 microns and a porosity of less than about 2% by volume of said body.

2. The body according to claim 1 wherein said average grain size is about 1 micron.

3. The body according to claim 1 wherein said body contains a glassy phase, said glassy phase ranging from a detectable amount up to about 5% by volume of said body.

4. The body according to claim 1 wherein said porosity is less than 1% by volume of said body.

5. A body consisting of polycrylstalline mullite phase of substantially uniform grain size having an average grain size of less than 1 micron and a porosity of less than 1% by volume of said body.

6. The body according to claim 5 wherein said body contains a glassy phase, said glassy phase ranging from a detectable amount up to about 5% by volume of said body.

7. A process for producing a body consisting essentially of polycrystalline mullite phase of substantially uniform grain size having an average grain size of less than 15 microns and a porosity of less than about 5% by volume which consists essentially of forming a mixture of amorphous alumino-silicate glass powder, alumina powder and nucleating polycrystalline mullite powder, said glass powder consisting essentially of from about 15% by weight to about 40% by weight $Al_2O_3$ balance $SiO_2$ and having a liquidus temperature below about 1800° C., said glass powder and alumina powder being present in amounts required to produce mullite, said nucleating mullite powder having a particle size of less than 15 microns and ranging from about 0.1% by weight to about 10% by weight of the total weight of said glass powder and alumina powder, and hot pressing the mixture at a temperature at which said glass is fluid ranging from about 1500° C. to about 1750° C. but below its liquidus temperature under a pressure at least sufficient to force the fluid glass to dissolve said alumina powder and react with it forming said polycrystalline body.

8. The process according to claim 7 wherein said glass powder consists essentially of from about 20% by weight to about 30% by weight $Al_2O_3$ balance $SiO_2$ and has a liquidus temperature below about 1760° C.

9. The process according to claim 7 wherein said hot pressing temperature ranges from about 1550° C. to about 1700° C.

10. The process according to claim 7 wherein said hot pressing pressure is at least about 200 psi.

11. The process according to claim 7 wherein said polycrystalline mullite body contains up to about 20% by volume of a glassy phase.

12. The process according to claim 7 wherein said polycrystalline mullite body contains up to about 20% by volume of a glassy phase, and wherein said body subsequently is heated at a temperature ranging from about 1200° C. to about 1500° C. to convert said glassy phase to polycrystalline mullite.

* * * * *